United States Patent
Lutz et al.

[11] Patent Number: 6,017,017
[45] Date of Patent: Jan. 25, 2000

[54] PROCESS AND APPARATUS FOR THE RECOGNITION OF THE STATE OF A SOLENOID VALVE

[75] Inventors: Danne Lutz, Ronnenberg; Holger Thies, Wunstorf, both of Germany

[73] Assignee: WABCO GmbH, Hannover, Germany

[21] Appl. No.: 09/156,465

[22] Filed: Sep. 18, 1998

[30] Foreign Application Priority Data

Sep. 24, 1997 [DE] Germany ............................ 197 42 038

[51] Int. Cl.$^7$ ................................................. F16K 31/02
[52] U.S. Cl. ............................... 251/129.15; 251/129.18; 251/129.19; 251/129.2; 251/129.05; 123/90.11; 324/416; 324/418; 324/422; 324/423; 324/420; 316/152; 316/154; 316/178; 137/551; 137/554
[58] Field of Search ............................ 251/129.01, 129.05, 251/129.15, 129.18, 129.19, 129.2; 137/551, 554; 123/90.11; 324/418, 416, 420, 422, 423; 361/152, 154, 178; 73/168; 116/277

[56] References Cited

U.S. PATENT DOCUMENTS

| | | |
|---|---|---|
| 5,245,501 | 9/1993 | Locher et al. ............................ 361/154 |
| 5,311,903 | 5/1994 | Poulin ...................................... 137/554 |
| 5,583,434 | 12/1996 | Moyers et al. ........................... 137/554 |
| 5,647,387 | 7/1997 | Tsutsui ............................... 251/129.05 |
| 5,650,909 | 7/1997 | Remele et al. ........................... 361/154 |
| 5,752,308 | 5/1998 | Maley et al. ........................ 251/129.15 |
| 5,889,405 | 3/1999 | Yanai et al. .............................. 324/418 |
| 5,942,892 | 8/1999 | Li ............................................ 137/554 |

FOREIGN PATENT DOCUMENTS

| | | |
|---|---|---|
| 2728666 | 11/1978 | Germany . |
| 3611220 | 1/1987 | Germany . |
| 3817770 | 11/1989 | Germany . |
| 3922900 | 1/1991 | Germany . |
| 3928651 | 3/1991 | Germany . |
| 4013393 | 10/1991 | Germany . |
| 4403156 | 4/1994 | Germany . |
| 4237706 | 11/1994 | Germany . |
| 4433209 | 3/1996 | Germany . |

*Primary Examiner*—Steven O. Douglas
*Assistant Examiner*—Khoa Huynh
*Attorney, Agent, or Firm*—Proskauer Rose LLP

[57] ABSTRACT

A method and apparatus for the recognition of the state of a solenoid valve supplies an on/off control switching current to the coil of the solenoid valve. A high level of current is caused to flow through the coil for switching the device on, and a reduced level of current is applied to the coil for holding the solenoid armature in its on position. If the armature should be caused to drop off from its on position by a mechanical shock, an increase in the frequency of the switching current occurs, due to the decrease in magnetic circuit inductance. This frequency increase is detected and compared to a predetermined threshold value. If the detected frequency exceeds the threshold value, it is recognized as an armature drop off, and corrective action can be taken immediately.

12 Claims, 2 Drawing Sheets

PROCESS AND APPARATUS FOR THE RECOGNITION OF THE STATE OF A SOLENOID VALVE

RELATED CASE

The present application contains subject matter that is related to that disclosed in the commonly assigned application entitled "Process and Apparatus For Drop-Off Recognition In A Magnetically Operated Device" which is being filed concurrently herewith.

FIELD OF THE INVENTION

The present invention relates to a process and apparatus for the recognition of the state of a solenoid valve. More specifically, the present invention relates to a technique for sensing the drop off of a solenoid armature.

BACKGROUND OF THE INVENTION

It is well known in the solenoid valve art that solenoid coil power is supplied by either a longitudinal regulator or a switching regulator. In either case, the function of the regulator is to adjust and control the supply voltage at an appropriate level for the magnetizing solenoid coil.

Since a switching regulator is generally more efficient than a longitudinal regulator, it is usually preferred in solenoid valve applications. A switching regulator alternately switches the supply voltage on and off to the solenoid coil. When the supply is switched on, the resultant current flow in the solenoid coil rises exponentially. When the current level reaches an upper limit value, the regulator shuts the supply off. As a result, the current then drops exponentially. When the current reaches a lower limit value, the supply voltage is again switched on by the action of the regulator. Thus, a mean supply voltage is established, which is regulated at a suitable value for a particular magnetizing solenoid coil. This type of process is disclosed in the German patent application DE 38 17 770.

To be able to switch on a solenoid valve rapidly and reliably, a relatively strong current is initially required for the magnetizing coil. The resulting magnetic force causes the armature of the solenoid to be moved against the force of a return spring. When the armature has reached its switch on position, the magnetizing current is lowered to a holding value, which is sufficient to hold the armature in place. This holding current is preferably adjusted to the lowest possible value, in order to save energy during continuous operation. There is, of course, a nominal holding current limit for reliably preventing the armature from dropping off. This nominal current limit must be set conservatively, i.e., at a higher than minimal level, if the solenoid valve is located in an area exposed to mechanical shock and vibration. This is generally the case, for example, if the solenoid valve is installed in a motor vehicle, especially in the proximity of the engine. This type of environment may cause a holding armature to drop off accidentally, causing the solenoid valve to shut off (or on) a pressure medium. Such an erroneous actuation should be avoided in any situation, but especially when the solenoid valve is used in an application that is relevant for safety, e.g., in the anti-lock braking system of a vehicle.

In the prior art, as disclosed in German patent applications DE 27 28 666 and DE 38 17 770, there are known techniques for recognizing the type of solenoid failure caused by a jammed armature. In these configurations, the switch on current waveform is monitored to detect a sudden deflection, which typically occurs at the time of armature movement.

However, the present invention has a different objective; namely, to detect armature drop off from a holding position as a result of a mechanical disturbance, and to take immediate corrective actions, including automatic restart and transmittal of an error message.

It is a further object of the present invention to detect armature drop off without the addition of special sensors.

It is yet a further object of the present invention to enable a significant reduction in the holding current safety margin, to such an extent that the power loss of a solenoid valve in continuous operation can be reduced by half. As a result, the structural volume of the solenoid valve can also be reduced.

SUMMARY OF THE INVENTION

In accordance with an illustrative embodiment of the present invention, a method for the recognition of the state of a solenoid valve is as follows:

a) supplying a large magnitude regulated switching current to the solenoid valve coil to achieve switch on of the solenoid valve armature, b) reducing the switching current magnitude to a lower level which is sufficient to hold the armature in the switch on position, c) monitoring the frequency of the lower level switching current with a frequency detection device, d) comparing the detected lower level switching current frequency with a predetermined threshold value, which represents an upper limit of the lower level switching frequency attributable to a drop off of the armature, e) generating an error signal when the detected lower level switching current frequency exceeds the predetermined threshold value, and f) restarting the initial turn on cycle in order to return the armature to its switch on position.

An illustrative embodiment of the present invention is more fully described below in conjunction with the following drawings.

DETAILED DESCRIPTION OF THE INVENTION

Figure 1:
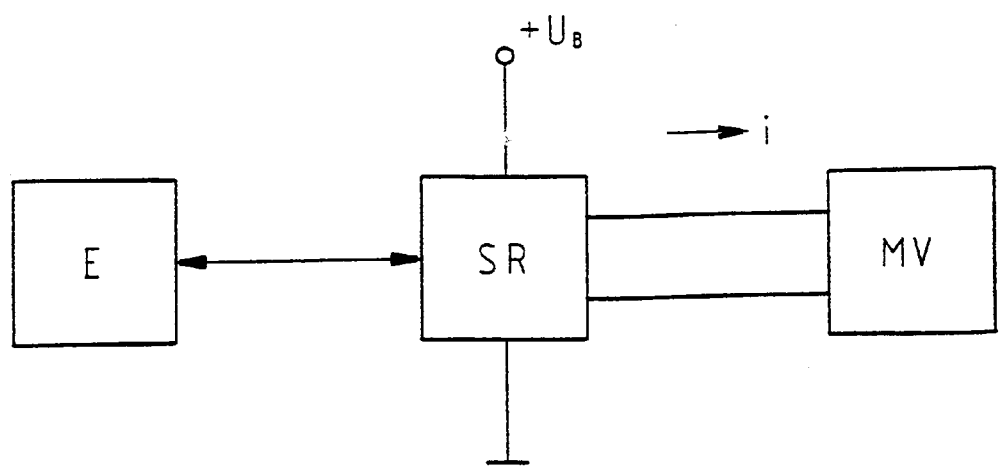
FIG. 1 shows a block diagram of a solenoid valve actuated by a switching regulator.

As shown in FIG. 1, a solenoid valve MV is powered by a switching regulator SR in an on/off control. Switching regulator SR receives its power from supply voltage $U_B$, and provides an alternating (switching) coil current i through the coil winding of solenoid valve MV. An electronic system E serves to control switching regulator SR. Electronic system E can also receive signals, such as the regulating frequency, from switching regulator SR.

Figure 2:
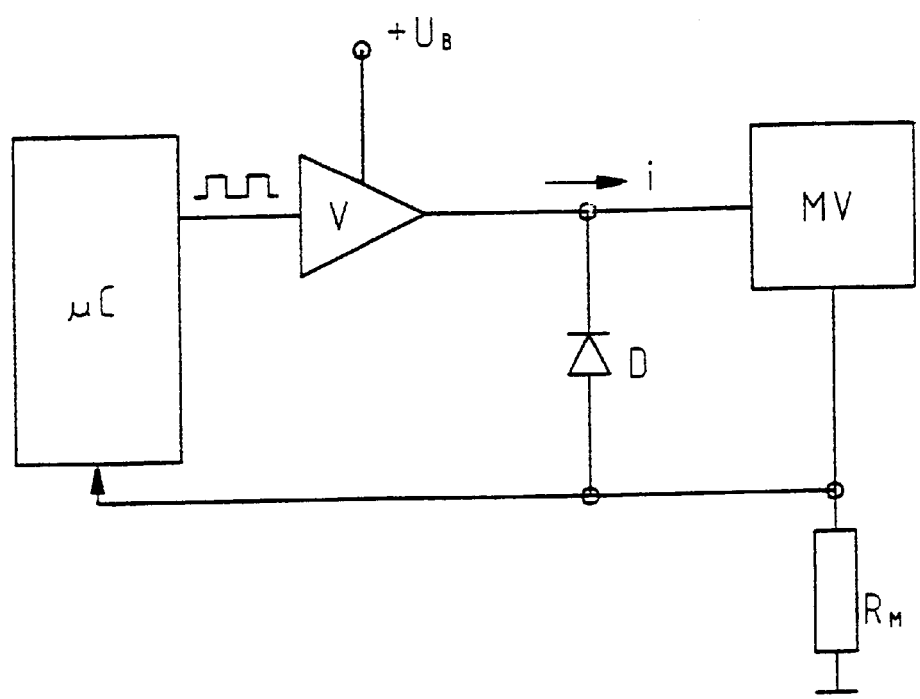
FIG. 2 shows a block diagram of the solenoid valve actuated by a micro-controller and amplifier.

FIG. 2 shows a variant of the actuating circuitry for solenoid valve MV. In this configuration, the coil of solenoid valve MV is driven by alternating pulses, which are generated by a micro-controller $\mu C$, via an amplifier V. The circuit is powered by a supply voltage $U_B$. The resultant current i through the solenoid coil is sensed by means of a measuring resistance $R_M$, which is connected in series with the coil of solenoid valve MV. Resistance $R_M$, is approximately 0.1 ohm, and provides feedback of a coil current waveform signal to micro-controller µC. A recovery diode D is also provided to facilitate the switching off of the coil current i, and is connected in parallel with the coil of solenoid valve MV.

Figure 3:
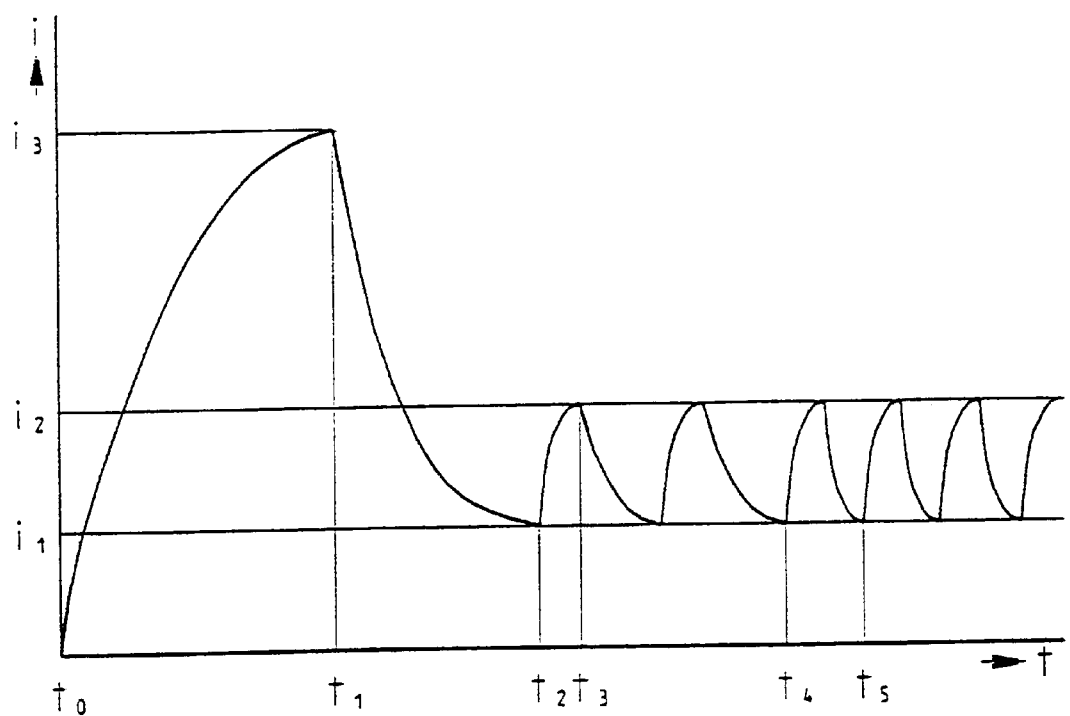
FIG. 3 shows an amplitude-versus-time graph of the solenoid valve coil current.

FIG. 3 shows a graph of coil current i versus time t. At time $t_0$, solenoid valve MV is switched on, by switching regulator SR or by micro-controller µC, connecting the full supply voltage $U_B$ across the coil of solenoid valve MV. Current i rises exponentially until it reaches the upper limit value $i_3$ at time $t_1$. The limit value $i_3$ is sensed by switching regulator SR, or by micro-controller µC, causing supply voltage $U_B$ to be switched off.

Since the initial voltage $U_B$ impressed across the solenoid coil is considerably higher than its nominal (holding) voltage, solenoid valve MV is switched on very rapidly. Upper limit current $i_3$, however, is not suitable for continuous operation of solenoid valve MV. Therefore, when limit value $i_3$ is reached at time $t_1$, switching regulator SR, or micro-controller µC, switches supply voltage $U_B$ off. Current i then drops exponentially via a recovery diode in the driver circuitry (within switching regulator SR in FIG. 1, or through diode D in FIG. 2). When current i reaches a lower limit value $i_1$ at time $t_2$, an on/off control cycle begins. That is, supply voltage $U_B$ is switched on again until current i reaches holding limit value $i_2$ at time $t_3$. At this time, supply voltage $U_B$ is again switched off.

Consequently, coil current i varies within the limits $i_1$ and $i_2$, in a holding operational state. The resultant mean current level is such that the armature of solenoid valve MV is held securely in the switched on state. This mean (holding) current level, however, would not be sufficient for switching on solenoid valve MV initially.

At time $t_4$, it is assumed that a mechanical shock impacts solenoid valve (MV) with sufficient magnitude to overcome the holding current force. This causes the solenoid armature to drop off from its switch on position. As a result, the air gap in the magnetic circuit of solenoid valve MV is increased, which causes the magnetic circuit inductance to decrease. Consequently, this decreased inductance has the effect of increasing the switching frequency of holding current $i_1,i_2$, as shown by the shorter time interval between $t_4$ and $t_5$, in FIG. 3.

This switching frequency increase is advantageously detected and measured by circuitry within switching regulator SR, or within electronic system E, or within micro-controller µC in conjunction with measuring resistance $R_M$. In FIG. 3, the increased frequency can be recognized at the end of the period following $t_4$, i.e., at time $t_5$. The detected frequency value is then compared to a predetermined threshold value. If the detected frequency value exceeds the threshold value, an armature drop off is recognized. Upon recognizing an armature drop off, it is especially advantageous to immediately generate a new switch on impulse cycle, as shown between $t_0$ and $t_2$, and thereby to switch solenoid valve MV back on as quickly as possible. At the same time, an error message can be transmitted by switching regulator SR, electronic system E, or micro-controller µC.

The present invention can be implemented by using Model C167™ of the Siemens Corporation as the micro-controller µC, or model TCA965B™ of the Siemens Corporation as the switching regulator SR.

Advantageously, micro-controller µC, amplifier V, recovery diode D, and measuring resistance $R_M$ can all be integrated into solenoid valve MV, or they can constitute a building block in conjunction with solenoid valve MV. Thus, it is possible to obtain the benefits of the present invention within an especially compact unit. In addition, by selecting an appropriate micro-controller (µC), the inventive device can have bus capability as well, in order to be suitable for direct connection to a bus system.

In short, a method and apparatus is disclosed which enables the rapid detection and recovery of an armature drop off in a solenoid valve. Moreover, the disclosed invention can also be implemented with any type of electromagnetically actuated armature device.

The above described embodiments of the invention are intended to be illustrative only. Numerous alternative embodiments may be devised by those skilled in the art without departing from the spirit and scope of the following claims.

We claim:

1. A method for the recognition of the state of an electromagnetically controlled valve, comprising the steps of:

a) supplying a first magnitude regulated switching current to a coil of said electromagnetically controlled valve to achieve switch on of an armature of said valve, b) reducing said first magnitude of said switching current to a second magnitude level sufficient to hold said armature in said switch on position, wherein said second magnitude level is less than said first magnitude level, c) monitoring the frequency of said second magnitude switching current with a frequency detection device, d) comparing said detected second magnitude switching current frequency with a predetermined threshold value, said threshold value representing a second magnitude switching current frequency upper limit attributable to a drop off of said armature from said switch on position, e) wherein when said armature of said electromagnetically controlled valve drops off from said switch on position, the resulting increase in said second magnitude switching current frequency exceeds said predetermined threshold value, and an error signal is generated.

2. The method of claim 1, wherein said first magnitude switch on signal is generated automatically whenever said second magnitude switching current frequency exceeds said predetermined threshold value.

3. An apparatus for the recognition of the state of an electromagnetically controlled valve, comprising:

a control circuit, a regulated current switching circuit, connected to and controlled by said control circuit, wherein said switching circuit generates a first magnitude switching current and a second magnitude switching current, said first magnitude switching current being greater than said second magnitude switching current, said electromagnetically controlled valve, having said armature within a coil, said coil being connected to said regulated current switching circuit, wherein when said first magnitude switching current flows through said coil, said armature moves to its switch on position, and wherein when said second magnitude switching current flows through said coil after said armature is in said switch on position, said armature is held in said switch on position, a frequency detector, connected to said coil circuit of said electromagnetically controlled valve, wherein when said armature of said electromagnetically controlled valve drops off from a switch on position, and wherein the resulting increase in frequency of said second magnitude switching current exceeds a predetermined threshold value, an error signal is generated by said apparatus.

4. The apparatus of claim 3 wherein said control circuit and said regulated current switching circuit are replaced by a micro-controller circuit and an amplifier circuit.

5. The apparatus of claim 4 wherein said frequency detector is integrated into said micro-controller circuit.

6. The apparatus of claim 4 further comprising a recovery diode connected in parallel with said coil.

7. The apparatus of claim 4 further comprising a measuring resistance connected in series with said coil.

8. The apparatus of claim 7 wherein said single structural unit has bus capability.

9. The apparatus of claim 4 wherein said micro-controller, said amplifier, said recovery diode, and said measuring resistance form a single structural unit with said electromagnetically controlled valve.

10. The apparatus of claim 3 wherein said frequency detector is integrated into said regulated current switching circuit.

11. The apparatus of claim 3 wherein said frequency detector is integrated into said control circuit.

12. The apparatus of claim 3 wherein said frequency detector determines said second magnitude switching current frequency by counting its period lengths.

* * * * *